(12) United States Patent
Marsh

(10) Patent No.: US 10,628,821 B2
(45) Date of Patent: Apr. 21, 2020

(54) ACTIVATION AND ASSIGNING VALUE TO GIFT CARDS USING RFID

(71) Applicant: American Greetings Corporation, Cleveland, OH (US)

(72) Inventor: Allison Marsh, Olmsted Falls, OH (US)

(73) Assignee: American Greetings, Cleveland, OH (US)

( * ) Notice: Subject to any disclaimer, the term of this patent is extended or adjusted under 35 U.S.C. 154(b) by 171 days.

(21) Appl. No.: 15/721,995

(22) Filed: Oct. 2, 2017

(65) Prior Publication Data

US 2018/0025349 A1     Jan. 25, 2018

Related U.S. Application Data

(63) Continuation-in-part of application No. 15/417,074, filed on Jan. 26, 2017.

(60) Provisional application No. 62/403,600, filed on Oct. 3, 2016, provisional application No. 62/287,206, filed on Jan. 26, 2016, provisional application No. 62/400,866, filed on Sep. 28, 2016.

(51) Int. Cl.
    *G06Q 20/34*     (2012.01)
    *G06Q 20/32*     (2012.01)

(52) U.S. Cl.
    CPC ....... *G06Q 20/354* (2013.01); *G06Q 20/3278* (2013.01); *G06Q 20/341* (2013.01); *G06Q 20/348* (2013.01); *G06Q 20/3433* (2013.01); *G06Q 20/352* (2013.01)

(58) Field of Classification Search
    CPC ................................................. G06Q 20/354
    See application file for complete search history.

(56) References Cited

U.S. PATENT DOCUMENTS

| | | |
|---|---|---|
| 6,588,660 B1 | 7/2003 | Buescher et al. |
| D538,855 S | 3/2007 | Ungar |
| 7,954,716 B2 | 6/2011 | Narendra et al. |
| 8,127,999 B2 | 3/2012 | Diamond |
| 8,393,547 B2 | 3/2013 | Kiekhaefer et al. |
| 8,418,384 B2 | 4/2013 | Jin et al. |
| 8,453,926 B2 | 6/2013 | Hunt |
| D685,635 S | 7/2013 | Glass et al. |
| 8,480,001 B2 | 7/2013 | Diamond |
| 8,561,830 B2 | 10/2013 | Hallberg |
| 8,596,547 B2 | 12/2013 | Diamond |
| 8,655,762 B2 | 2/2014 | Abifaker |
| 8,657,203 B2 | 2/2014 | Diamond |
| 8,763,896 B2 | 7/2014 | Kushevsky et al. |
| 8,919,658 B2 | 12/2014 | Diamond |
| 9,038,291 B2 | 5/2015 | Canaday et al. |
| 9,038,894 B2 | 5/2015 | Khalid |
| 9,111,275 B2 | 8/2015 | Miller et al. |
| 9,122,964 B2 | 9/2015 | Krawczewicz |
| 9,139,353 B2 | 9/2015 | Glass et al. |

(Continued)

*Primary Examiner* — A. Hunter Wilder
(74) *Attorney, Agent, or Firm* — Christine Flanagan

(57) ABSTRACT

The present disclosure and related inventions describe a system and method by which gift cards may be user-activated and assigned value using Radio Frequency Identification (RFID). The user-activated gift card contains an RFID chip embedded therein that works in conjunction with a mobile website or mobile app to allow users to activate and assign value to the gift card at any time and at any place.

6 Claims, 3 Drawing Sheets

(56) References Cited

U.S. PATENT DOCUMENTS

| | | | |
|---|---|---|---|
| 9,152,963 B2 | 10/2015 | Blackhurst et al. | |
| 9,159,014 B2 | 10/2015 | Narendra et al. | |
| 9,202,240 B2 | 12/2015 | Kingsborough | |
| 9,208,424 B2 | 12/2015 | Narendra et al. | |
| 9,349,125 B2 | 5/2016 | Kushevsky et al. | |
| 9,355,392 B2 | 5/2016 | Blackhurst et al. | |
| 9,390,411 B2 | 7/2016 | Jarman et al. | |
| 9,430,766 B1 | 8/2016 | Kraft | |
| 9,481,196 B2 | 11/2016 | Canaday et al. | |
| D774,881 S | 12/2016 | Glass et al. | |
| 9,597,916 B2 | 3/2017 | Begin et al. | |
| 9,630,748 B2 | 4/2017 | Keller | |
| 9,694,925 B1 * | 7/2017 | Florio | B42D 15/045 |
| 2006/0190332 A1 | 8/2006 | Grider | |
| 2006/0273153 A1 * | 12/2006 | Ashby | G06Q 20/342 235/380 |
| 2007/0200680 A1 | 8/2007 | Colby | |
| 2010/0131413 A1 | 5/2010 | Kranzky et al. | |
| 2012/0130892 A1 * | 5/2012 | Ronayne | G06Q 20/0655 705/41 |
| 2012/0265624 A1 * | 10/2012 | Kingsborough | G06Q 30/06 705/16 |
| 2012/0290449 A1 | 11/2012 | Mullen et al. | |
| 2013/0166441 A1 * | 6/2013 | Kobylkin | G06Q 20/354 705/39 |
| 2014/0252087 A1 | 9/2014 | Kushevsky et al. | |
| 2015/0006273 A1 * | 1/2015 | Scipioni | G06Q 30/0224 705/14.25 |
| 2015/0079326 A1 * | 3/2015 | Snow | G09F 3/0292 428/42.1 |
| 2015/0097037 A1 | 4/2015 | Narendra et al. | |
| 2015/0170138 A1 | 6/2015 | Rao | |
| 2015/0302395 A1 | 10/2015 | Rinaldi | |
| 2016/0048829 A1 | 2/2016 | Kingsborough | |
| 2016/0162868 A1 | 6/2016 | Blackhurst et al. | |
| 2016/0189143 A1 | 6/2016 | Koeppel | |
| 2016/0239828 A1 | 8/2016 | Krushevsky et al. | |
| 2016/0371668 A1 | 12/2016 | Priebatsch et al. | |

\* cited by examiner

ACTIVATION AND ASSIGNING VALUE TO GIFT CARDS USING RFID

RELATED APPLICATIONS

This application is a non-provisional of and claims priority to U.S. Provisional Patent Application No. 62/403,600, filed on Oct. 3, 2016, a copy of which is incorporated herein by reference in its entirety.

This application is also a continuation-in-part of and claims priority to U.S. patent application Ser. No. 15/417,074, filed on Jan. 26, 2017, which claims priority to U.S. Provisional Patent Application No. 62/287,206, filed on Jan. 26, 2016, U.S. Provisional Patent Application No. 62/400,866, filed on Sep. 28, 2016, and U.S. Provisional Patent Application No. 62/403,600, filed on Oct. 3, 2016. A copy of each of the above-referenced patent applications is incorporated herein by reference in its entirety.

FIELD OF THE INVENTION

This invention is in the field of gift cards and more specifically, the activation of gift cards.

BACKGROUND OF THE INVENTION

Gift cards typically resemble a credit card or display a specific theme on a plastic card having a magnetic stripe and/or bar code thereon (typically on the back surface thereof) which contains the dollar amount of the gift card. This amount can be stored on the card itself or stored in a database controlled by the seller and cross-linked to an ID stored on the magnetic strip or bar code. These gift cards are typically purchased, activated and loaded (assigned value) at retail point of sale (POS). There is a need in the art for gift cards which can bypass POS and be activated by the purchaser, at the purchasers preferred time and place.

SUMMARY OF THE INVENTION

In one aspect of this disclosure, a gift card includes an RFID chip or tag contained on or on the gift card, the RFID chip or tag comprising at least one unique identification number associated with the gift card saved thereon. A user may activate and assign value to this gift card using a mobile device.

In another aspect of this disclosure, a method for activating a gift card includes the steps of receiving from a mobile device a unique identification number read from an RFID chip in or on the gift card, receiving from the mobile device a value to be assigned to the gift card, receiving from the mobile device payment information, processing payment information for an amount equal to the value to be associate with the gift card, and activating the gift card for the amount equal to the value to be associated with the gift card.

In another aspect of this disclosure, a system for activating a gift card includes a mobile website, the mobile website having the ability to read information saved to an RFID chip or tag contained in or on a gift card, a central processing system, which receives a first information read from the RFID chip or tag from the mobile website, the first information comprising a unique identification number associated with the gift card, receives a second information from the mobile website, the second information comprising payment information, receives a third information from the mobile website, the third information comprising a value to be assigned to the gift card, processes the payment information for the amount to be assigned to the gift card, sending the first and third information to a gift card activator and requesting that the gift card be activated, receiving confirmation from the gift card activator that the gift card has been activated, and sending a message to the mobile website indicating that the gift card has been activated.

DETAILED DESCRIPTION OF PREFERRED AND ALTERNATE EMBODIMENTS

Figure 1:
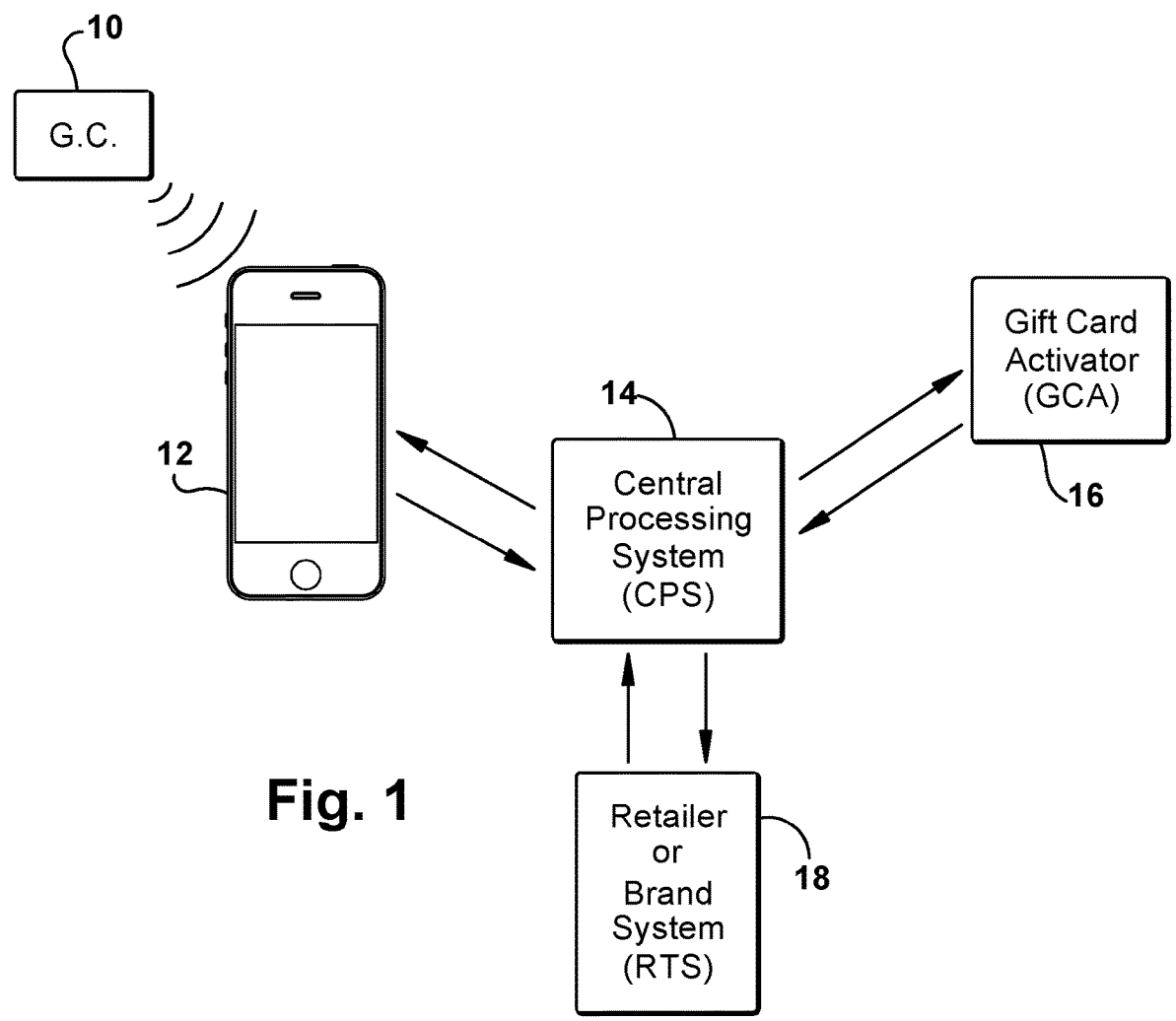
FIG. 1 is a system diagram.

The present disclosure and related inventions describe a system and method by which gift cards may be user-activated and assigned value using Radio Frequency Identification (RFID).

The user-activated gift card contains an RFID chip or tag attached thereto or embedded therein that works in conjunction with a mobile website or mobile application to allow users to activate and assign value to the gift card at any time and at any place.

Gift Card

As used herein, the term "gift card" is defined as being a restricted monetary equivalent issued by retailers or banks to be used as an alternative to a non-monetary gift. Gift cards are legal tender purchased for use by a consumer and useable in its face amount in lieu of cash in exchange for goods and services supplied by the seller. "Open loop" gift cards are issued by banks or credit card companies and can thus be redeemed at different establishments. Examples of open loop gift cards include, but are not limited to: Visa® and MasterCard®. "Closed loop" gift cards are issued by a specific retailer or restaurant and can only be redeemed by the issuing provider. Gift cards can be "reloadable" wherein once the dollar amount has been used, additional amounts can be added to the card such that the same gift card can be used multiple times. The term "gift card" can be used interchangeably with the term "transaction card". While not all gift cards are stored value cards (dollar amount actually stored on the card itself), stored value cards are intended to be included under the term "gift cards" as used herein.

In one embodiment, the gift card may be in the shape of a standard or typical gift card, as described above, resembling a credit card or plastic card having a substantially rectangular shape and an approximate 3⅜-inch width and an approximate 2⅛-inch height. In another embodiment, the gift card may have a different shape, such a circle, square, triangle or may be shaped to resemble an item such as, for example, a flower, a cupcake, a Christmas tree, a present or any other conceivable shape. In another embodiment, the gift card may be in the form of a greeting card. In another embodiment, the gift card may be in the form of a small token such as, for example a coin, a figurine, a game piece, a badge, a ring, a fob, a key, or the like. In still another embodiment, the gift card may be in the form of a small gift item such as, for example, a plush toy or teddy bear, a doll, a toy car or truck, a travel mug, a piece of jewelry, etc. In yet another embodiment, the gift card may take the form of any of the embodiments described above, but also be placed inside a container such as a pre-wrapped container or otherwise hidden from view.

The gift card 10, in whatever form factor, contains an RFID chip or tag embedded therein or attached to a surface thereof. In one embodiment, a barrier film or material is applied over the RFID chip or tag to block the RFID signal until after purchase. In other embodiments, the gift card 10 may contain a security or redemption code for use in redeeming the gift card 10. The security of redemption code may be placed beneath a scratch off material, a non-transparent film, label or other material, or any other concealing material or device. In some embodiments, the gift card 10 may additionally contain a bar code and/or a magnetic stripe.

The RFID chip or tag, as is known in the art, can communicate with a device having an RFID reader. The RFID chip or tag contains, but is not limited to: a microchip or integrated circuit for storing and in some cases, processing information; and an antenna to receive and transmit information. In one embodiment, the RFID chip or tag may additionally contain a battery. The RFID chip may be active, semi-active or passive and may have read only or read/write capabilities. The RFID chip or tag may be low-frequency (LF), high-frequency (HF) or ultra-high-frequency (UHF). In one embodiment, the RFID chip or tag contains a unique identification number (unique ID) which represents the gift card number. In other embodiments, the RFID chip or tag may contain additional information. As is known in the art, the RFID chip or tag communicates with an RFID reader using radio waves. This form of identification allows for contactless activation and assignment of value of/to a gift card 10.

System

Unless otherwise defined, all terms used herein have the same meaning as commonly understood by one having ordinary skill in the art to which this technology applies. The examples set forth herein are intended to describe one or more embodiments and are not intended to limit the claimed invention in any way.

The term "software" or "computer program" as used herein includes, but is not limited to: one or more computer or machine readable and/or executable instructions that cause a computer, microprocessor, logic circuit, or other electronic device to perform functions, actions and/or behave in a desired manner. The instructions may be embodied in various forms such as routines, algorithms, modules or programs including separate applications or code from dynamically linked libraries. Software may also be implemented in various forms such as stand-alone programs, apps, a function call, a servlet, an applet, instructions stored in a memory or any other computer readable medium, part of an operating system or other type of executable instructions. It will be appreciated by one of ordinary skill in the art that the form of software is dependent on, for example, requirements of a desired application, the environment it runs on, and/or the desires of a designer/programmer or the like.

"Mobile device", as used herein, is a small computing device including but not limited to: a smartphone, a tablet computer, a personal data assistant (PDA), a gaming device, a laptop computer; and wearable technologies.

"Mobile application" or "Mobile App" or "App" as used herein, includes, but is not limited to: applications that run on smart phones, tablet computers and other mobile devices. The terms "mobile application", "mobile app" and "app" can be used synonymously with "software". Mobile applications allow users to connect to services which are traditionally available on a desktop or notebook platforms. Typically, these services access the internet or intranet or cellular or wireless fidelity networks to access, retrieve, transmit and share data.

The terms "computer", "processor" or "processing unit" as used herein, includes, but is not limited to: any programmed or programmable electronic device, microprocessor, logic unit that can store, retrieve and process data.

The term "network" as used herein includes, but is not limited to: a collection of hardware components and computer or machines interconnected by communications channels that allow sharing of resources and information, including, without limitation, the worldwide web or the internet.

The term "web browser", as used herein, includes, but is not limited to: a collection of hardware components and computer machines interconnected by communications channels that allow sharing of resources and information, including and without limitation, the world wide web or the Internet.

The term "server" as used herein, includes, but is not limited to: a computer or machine or a device on a network that manages network resources. The general term "server" may include specific types of servers such as a file server (a computer and storage device dedicated to storing files), a print server (a computer that manages one or more printers), a network server (a computer than manages network traffic), and a database server (a computer system that processes database queries). Although servers are frequently dedicated to performing only server tasks, certain multiprocessing operating systems allow a server to manage other non-server related resources. A "web server" as used herein, includes, but is not limited to: a server which serves content to a web browser by lading a file from a disk and serving it across a network to a user's web browser, typically using a hyper-text transfer protocol (HTTP).

The term "cloud", as used herein, includes but is not limited to: a service or services for computer resources, including, but not limited to: Infrastructure-as-a-Service (IASS); Platform-as-a-service (PASS), Software-as-a-Service (SAAS) and other forms of hosted computer resources. Said resources replacing or supplementing traditional servers, networks, storage and processors, as well as providing aggregate services not available on traditional computer resources.

The term "cloud application", as used herein, may include, but is not limited to: a computer program or software implemented on cloud services, including but not limited to: IAAS; PAAS; and SAAS.

"API files" or "API" or "Application Programming Interface" as used herein, includes, but is not limited to: an interface between different software programs or software files which facilitate the interaction of the different software programs or software files by way of a specific set of rules and specifications.

In one embodiment, the system of the present disclosure and related inventions may include, but is not limited to: a computing device 12, a gift card management web site, a central processing system (CPS) 14, a gift card activator (GCA) 16; a server, physical or virtual comprised of memory; a central processing unit (CPU); a network interface and one or more storage devices; a network, either physical, wireless or a combination thereof, comprising one or more routers, switches, firewalls and other network appliances; and an API. The servers and the network may be implemented as IAAS, PAAS, SAAS, or any other form of hosted computing.

In one embodiment, the system and method of the present disclosure and related inventions communicate with a gift card management website (hereinafter referred interchangeably with "the website" and "mobile website"). The gift card management website may be a proprietary website which provides means by which a user may, among other things, activate and assign value to the user-activated RFID gift card 10 (referred to herein interchangeably with "the gift card" and "user-activated gift card"). This embodiment can be used in conjunction with a mobile device which contains a native NFC reader. The chip or tag embedded within or otherwise attached to the gift card 10 may contain information such as a Uniform Resource Locator (URL) containing the internet address of a gift card management website for managing the user-activated RFID gift card. In one embodiment, the operating system of the mobile device may contain native support to read an RFID chip or tag, automatically open a web browser and navigate to a specified URL for the gift card management website (contained within the data read from RFID chip or tag) or prompt the user to approve opening the web browser and navigation to the URL. In another embodiment, the operating system of the mobile device may be RFID capable but require that a RFID reader application be installed. The RFID reader application would read the RFID tag, extract the URL and open a web browser to that address. In one embodiment, a unique ID corresponding to the gift card 10 is embedded within or appended to the URL. Once the user has reached the gift card management website he/she may communicate with the website via a user interface which provides users with various functionality relating to management of the gift card 10. This functionality may include, but is not limited to: creating a user account; entering and optionally saving payment information, such as, for example, credit card information, PayPal® account information, Apple Pay or Apple Wallet account information, or any other possible payment device or account; validating that the gift card 10 is legitimate and that it has not yet been activated; activating and loading or assigning value to a gift card 10; checking the balance of a gift card 10; redeeming a gift card 10; receiving a message when a gift card 10 that has been given to a recipient by the user is redeemed; reviewing gift card activation and loading history; and other gift card related functions. As used herein, the term "loading" as in "loading a gift card", refers to the act of assigning value to a gift card. The user interacts with the website via the mobile device upon which the website is open. User input may be entered to the website via a touchscreen, keyboard, keypad, microphone, scanner, camera or any other input device available for use with the mobile device upon which the website is opened. The website may be in communication with one or more external physical devices and software applications which may in turn communicate with one or more databases and memory on which is stored computer executable code or logic and one or more computer algorithms. The one or more databases may create, read, update and delete data used by the gift card management website or other networked devices. The one or more databases and memory can be stored externally, such as on a cloud platform. Upon opening the website may prompt the user, through the user interface on the mobile device, to either log in or create a new account. A user may create an account by signing in using a preexisting identity management system such as a Facebook or Google+ account or by completing the account setup or registration process. The account setup or registration process may prompt the user to enter information including, but not limited to: name; address; phone number; email address; gender; credit card or other payment system information; and password.

In another embodiment, the system and method of the present disclosure and related inventions employs a proprietary mobile application (also referred to herein interchangeably as "the app", "mobile app" or "app") for use in managing the user-activated, RFID enabled gift card 10. The mobile app may be downloaded to a mobile device 12 from the Apple App Store, Google Play Marketplace, Chrome Web Store, or any other online marketplace. Alternatively, the app may be downloaded to a mobile device 12 by any non-marketplace means. The mobile app may be in communication with all of the devices described above with respect to the gift card management mobile website and provide the user with all of the functionality described above with respect to the gift card management mobile website.

The CPS 14 may execute business logic, store and manage data items, such as unique gift card IDs, gift card account numbers, etc. In one embodiment, the CPS 14 receives information from and sends information to the gift card management website (or mobile app), a gift card activator (GCA) 16, and individual retailer or brand system (RTS) 18, via an API. The CPS 14 may reside at a remote internet-accessible location or it may be cloud-based.

The term "retailer or brand system" or "RTS", as used herein, refers to systems or platforms which are controlled by the retailer or brand from which a gift card has issued.

The term "gift card activator" or GCA", as used herein, refers to payment services or platforms which handle gift card processing functions which include, but are not limited to: gift card activation; gift card balance management tracking and authorization, and settlement services. The GCA 16 may be a third-party service such as, for example, First Data Corporation and Stored Value Services (SVS). Alternatively, the GCA 16 may be a proprietary, in-house or part of the same entity responsible for the gift card management website and/or the CPS 14. The GCA 16 may communicate with, among other entities or systems, the CPS 14 and RTS 18, in addition to financial institutions.

A system diagram is shown in FIG. 1. It should be understood that the CPA 14, GCA 16 and RTS 18, may each contain components which include, but are not limited to: a server, physical or virtual comprised of memory; a central processing unit (CPU); a network interface and one or more storage devices; a database; a network, either physical, wireless or a combination thereof, comprising one or more routers, switches, firewalls and other network appliances; and an API. It should also be noted that in FIG. 1, the GCA 16 and the RTS 18 are shown as a single entity, but there can be more than one GCA 16 and RTS 18 and the diagram is intended to cover more than one GCA 16 and RTS 18.

Process

Figure 2:
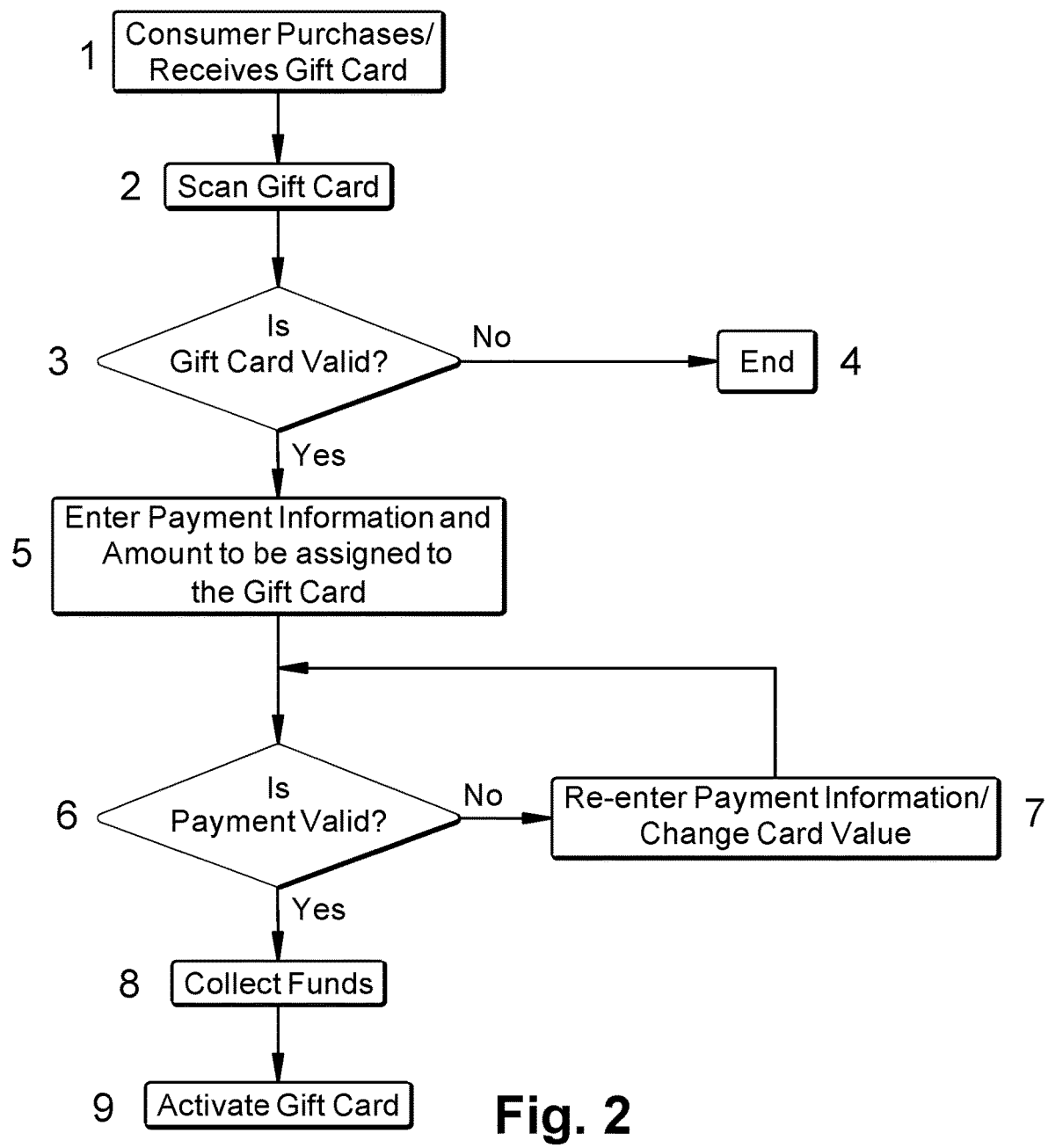
FIG. 2 is a high-level overview of a process for activation and assignment of value to a gift card.
Figure 3:
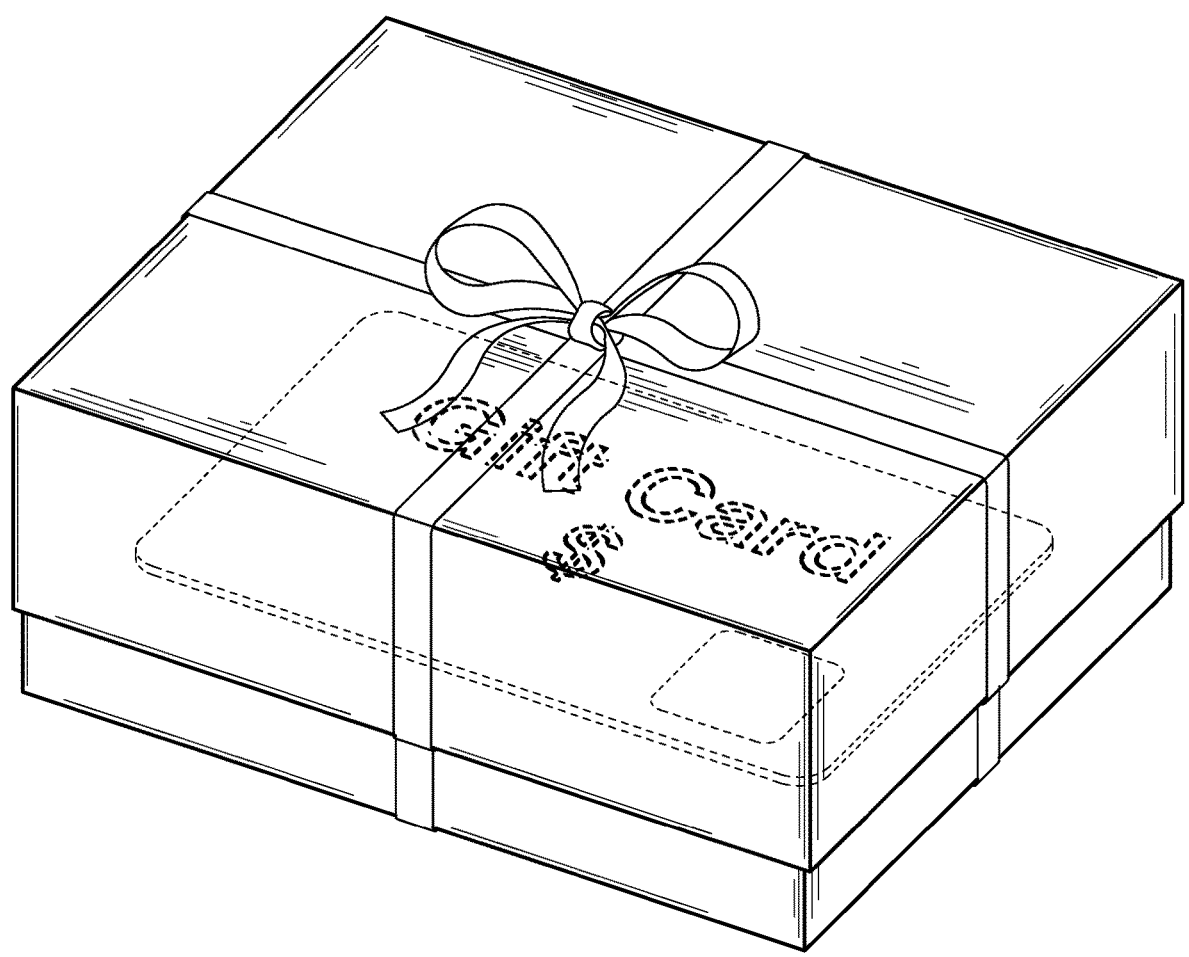
FIG. 3 is one embodiment of the gift card of the present invention within a pre-wrapped package.

FIG. 2 shows a high-level overview of the gift card activation and loading process. A more detailed process is set forth below. As shown in step 1, in one embodiment, the consumer may visit a store or other location to select a gift card 10 or a package containing a gift card for purchase. The gift card or package containing a gift card 10 may contain a barcode thereon which a cashier will scan at POS to determine the price of the unloaded gift card 10 (gift card without a value assigned thereto) or package containing an unloaded gift card 10. This amount is only for the physical embodiment of the gift card 10 or the package containing a gift card 10 and does not include an amount to be added to the gift card 10. As mentioned above, the gift card 10 may be in the form of a token or small gift item or may be pre-wrapped so these items are what the consumer would pay for at POS. Once the consumer has paid for the gift card/package containing gift card 10, he or she can load the gift card 10 at any time and from any location, assuming he/she is in possession of a mobile device 12 which contains an NFC reader. In another embodiment, the consumer may select and purchase an unloaded gift card 10 and/or packaging containing the unloaded gift card 10 from a website. In another embodiment, the user-activated RFID gift card may be included for free with a retail purchase. For example, a user-activated RFID gift card may be included in all ecommerce purchases from a retailer/merchant or included or attached to a greeting card or envelope sold by a retailer/merchant. In one embodiment, the user-activated RFID gift card may have a pre-set value. In another embodiment, the gift card is empty or unloaded. The consumer who received the user-activated RFID gift card free with purchase may remove the gift card and follow instructions printed on a backer or label to visit a website or application to activate and assign value to the gift card. Once the gift card has been activated and loaded, the consumer may present the gift card to a recipient. The recipient may then immediately redeem the gift card to his/her digital wallet or other electronic device.

As shown at step 2, if the user has a gift card 10 that he/she would like to load and activate, he/she can place the gift card 10 (or package it is contained in) near an NFC enabled mobile device 12. Depending on the type of RFID chip or tag used, the wireless communication range can range from a few inches to 20 feet or more. Other factors may affect the wireless communication range including, for example, the surrounding, the orientation of the RFID chip or tag, and frequency of operation. In one embodiment, once the NFC reader on the mobile device detects the RFID chip or tag embedded within or otherwise attached to the gift card, it reads the information contained on the RFID chip or tag which may include, but is not limited to: a unique ID corresponding to the gift card and a URL corresponding to a gift card management website. As mentioned above, the unique ID may be embedded within or appended to the URL. In one embodiment, the mobile device automatically performs an action based on the type of data read from the RFID chip or tag. For example, if the data read from the RFID chip or tag is a URL, the mobile device would open the URL in a web browser. In other embodiments, the NFC enabled mobile device may be unable to perform an action based on the data read from the RFID chip or tag and may require additional software such as an RFID reader app. From the gift card management website, the user may be given the opportunity to register or create a new account. The information that may be requested for registration or account set-up includes, but is not limited to: name; address; telephone number; email address; password; and credit, debit or payment service account number. After the user has either logged in or completed the registration or account set-up process, he/she can proceed to manage the gift card.

As noted above, in one embodiment, a unique ID corresponding to the gift card may be embedded within or appended to the URL. At step 3, the gift card management website extracts and sends or transmits this unique ID to the CPS 14 to verify that the unique ID is valid. The CPS 14 contains a list of all unique identification numbers (IDs) along with the brand code (indicates the specific brand of the gift card) and GCA 16 that is used by each brand which corresponds to each unique ID. At step 4, if the unique ID transferred to the CPS 14 by the website is invalid (not found in the database), the CPS 14 will send a message back to the website indicating that the gift card 10 is invalid. The website may display this message, via a user interface displayed on a screen of the mobile device 12, to the user along with a customer service phone number or web address. If the unique ID transferred to the CPS 14 by the website is valid, the CPS 14 will send the website a message indicating that the unique ID associated with the gift card 10 is valid. At step 5, the website will then prompt the user to enter, via a user input (keypad, keyboard, mouse, touch screen, etc.) on the mobile device, a value to be assigned to the gift card 10. The website may give the user pre-set options to select from, such as $10, $20, $50, $100, or may allow the user to enter a specific amount. The website will then prompt the user to enter payment information such as a credit card number, debit card number, PayPal® account number, etc. or the web site will display the payment information which has been saved within the system by the user. The user can elect whether to proceed to payment with the saved payment device or to enter a new payment device. The website then sends the value to be assigned to the gift card 10 (as specified by the user) and the user's payment information to the CPS 14. At step 6, the CPS 14 will confirm that the payment information is valid and whether the payment device has sufficient funds available to complete the transaction. If the payment information is not valid or if the transaction cannot be completed due to insufficient funds, the CPS 14 will send a message to the website. The website will then communicate this to the user. At step 7, the user may be given the option to correct or re-enter the payment information, add a different payment device and/or enter a lower gift card value amount and resubmit the transaction. At step 8, if the payment information is correct and the payment device contains sufficient funds, the CPS 14 will save the value and associate it with the unique ID associated with the gift card 10 and complete the transaction by collecting payment. The CPS 14 will also send the unique gift card ID and the value assigned to the gift card 10 to the retailer and brand's GCA, 16 along with a request that the GCA 16 activate the gift card 10. At step 9, the GCA 16 will officially activate and add funds to the gift card 10 and confirm activation of the gift card 10 by sending a message to the CPS 14. The CPS 14 will amend the database record to reflect that the gift card 10 is activated and send a message to the website indicating that the gift card 10 is activated. The website will then communicate to the user that the transaction is complete and the gift card 10 is activated. The CPS 14 will then transmit payment to the RTS 18 along with the unique ID from the gift card 10 and an indication that this gift card 10 has been sold and activated. The RTS 18 may then send a receipt or confirmation back to the CPS 14 indicating that the transmission was received.

In another embodiment, the above steps may be performed via a mobile application downloaded to the user's mobile device instead of through a gift card management website.

In another embodiment, the gift card management mobile device, via the gift card management website or mobile application, writes information, such as an activation indicator and the value assigned to the gift card 10 back to RFID chip on gift card 10. In this embodiment, the gift card 10 would operate as a stored value card instead of gift or transaction card.

As noted above, in one embodiment, the gift card 10 of the present disclosure and related inventions may be visible at retail and take on the typical gift card form factor. These gift cards 10 may contain a film or other material over the RFID chip to prevent scanning of the unique id of the gift card 10 until after purchase of the gift card 10. The user would be required to remove the film or other material from the gift card 10 prior to activation. In other embodiments, the gift cards 10 may be contained within a container or packaging such that the gift card is not visible at retail. The container or package may be a bag, box, or other such container that may be pre-wrapped with wrapping paper, ribbon, bows, or any other gift packaging accessory. The container will contain a sticker, tag, label or other identifier which indicates to the consumer the contents of the package, such as "user-activated Target® gift card enclosed". This provides for a quick and easy way for consumers to purchase a gift card 10 which is pre-wrapped for presentation to a recipient. Since the gift card 10 is user-activated via the RFID chip contained on or within the gift card 10, this allows the gift card 10 to be contained within a pre-wrapped package which can remain intact during activating and assignment of value, and then presented to a recipient as is. Similarly, the gift card 10 can have an atypical form factor, such as a key chain, trinket, wearable device, plush toy, or other such novelty or gift item. In these cases, the RFID chip or tag is contained within the item and not visible from the outer surface of the item. One advantage of this embodiment is that the gift card 10 can have different form factors, as described above, and is not limited to the typical gift card shape or to having a flat surface as, in these certain embodiments, it is not required to be scanned or inserted into a mag strip reader. For security purposes, the gift card 10 may contain a security or redemption code printed on or attached thereto for use in redeeming the gift card 10. The security or redemption code may be placed beneath a scratch off material, a non-transparent film, label or other material, or any other concealing material or device. In order to redeem the gift card 10, the recipient must have the security or redemption code from the gift card 10. This prevents the theft of the gift cards 10 contained within the pre-wrapped packages by scanning the RFID chip from the gift card 10 while at retail or any time prior to purchase.

Redemption

In one embodiment, the recipient of the gift card 10 can redeem the gift card 10 by using a NFC enabled mobile device to scan the gift card 10 for redemption. As described above with respect to activation and assigning value to the gift card, the information read from the RFID chip or tag embedded in or otherwise attached to the gift card may contain a URL of a gift card management website. Once the gift card management website is opened in a web browser on the user's mobile device, the user may then indicate that he/she wishes to redeem the gift card 10 (as opposed to activating and assigning value to the gift card 10). The website extracts the unique ID corresponding to the gift card from the information read from the RFID chip or tag and sends the unique ID to the CPS 14. The CPS 14 will in turn send the unique ID to the GCA 16 to confirm activation status and the value assigned to the gift card 10. If the gift card 10 is not activated, the GCA 16 will send a message to the CPS 14 indicating that the gift card 10 has not yet been activated. The CPS 14 will then send this message to the website and the website will display a message to the user indicating that the gift card 10 has not yet been activated and asking if the user would like to activate and assign value to the gift card 10. The website may also display a customer service phone number or URL. If the gift card 10 is activated, the GCA 16 will return the assigned value of the gift card 10 to the CPS 14. In one embodiment, in order to redeem the gift card 10, the user may have to enter a security or redemption code found on the gift card 10.

The security or redemption code may require the user to scratch, peel or otherwise remove material applied over the area of the gift card 10 containing the security or redemption code. In one embodiment, the user may have the option to transfer the funds from the gift card 10 to an online account at the retailer from which the card issued or, in the case of an open loop gift card, transfer the funds to a PayPal® account, to a digital wallet or other digital payment account or service. In another embodiment, upon the user's request to redeem the gift card 10, the website may return a serial number or gift card number that the user may enter into an online POS system to use the funds assigned to the gift card 10. In another embodiment, upon the user's request (via the app interface) and the entry of a security or redemption code, the website may send information to the RFID chip on or within the gift card 10 indicating the activated status and amount assigned to the gift card 10 so that the gift card 10 can be used at an RFID or NFC reader enabled payment terminal. The above-referenced options or embodiments set out for gift card redemption are not mutually exclusive and may be combined, allowing two or more ways in which the user may redeem the gift card.

In another embodiment, the user may use a downloaded mobile app to redeem the gift card 10 (in lieu of or in addition to the gift card management website). In this case, the user may interact with the graphical elements of the app (via touchscreen, mouse, keypad, keyboard, etc.) to follow the methods of redemption as described above with respect to the gift card management website.

In another embodiment, the user may automatically transfer funds from the gift card to his/her mobile wallet or other digital payment device directly via the RFID chip or tag embedded within or otherwise attached to the gift card.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

The invention claimed is:

1. A gift card container comprising:
   a gift card with an RFID chip or tag, the RFID chip or tag comprising and saved thereon at least one unique identification number associated with the gift card and a URL of a gift card management website; and
   a barcode which a cashier can scan at a point of sale (POS) to determine a price of the gift card container before the gift card is purchased and loaded;
   wherein the gift card is fully contained in the gift card container such that the gift card is not visible at the POS;
   wherein the gift card container is gift wrapped;
   wherein the gift card is configured to be activated and loaded at any time and from any location by a mobile device of a user after purchasing the gift container without having to remove the gift card from the gift wrapped gift card container; and
   wherein the gift card is further configured to be activated and loaded by near-field communication (NFC) between the mobile device and the RFID chip or tag and by the user interacting with the gift card management website using the mobile device.

2. The gift card container of claim 1, wherein the gift card container is in the form of a gift item.

3. The gift card container of claim 1, wherein the gift card container is given away for free with a retail purchase.

4. The gift card container of claim 1, wherein the gift card contains a security or redemption code printed thereon.

5. The gift card container of claim 1, wherein the gift card further comprises a magnetic stripe or a bar code.

6. The gift card container of claim 1, wherein the gift card is reloadable.

\* \* \* \* \*